J. CARPENTER.
Device for Detaching Horses.
No. 168,227.
Patented Sept. 28, 1875.
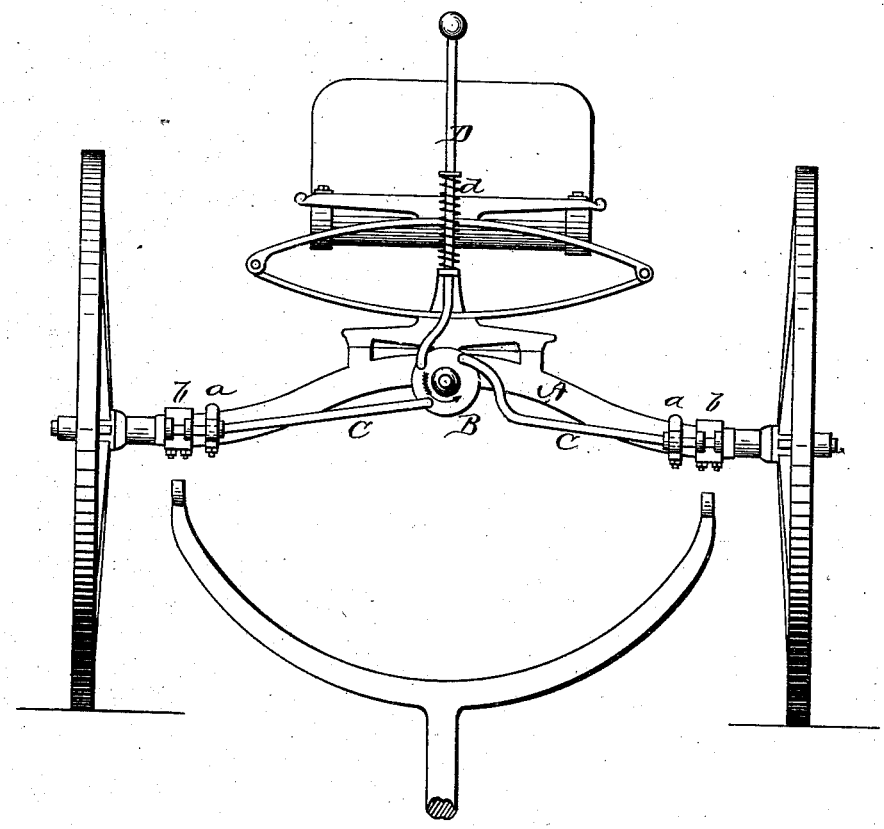
WITNESSES
INVENTOR

UNITED STATES PATENT OFFICE.

JESSE CARPENTER, OF SHERIDAN, MICHIGAN, ASSIGNOR OF ONE-FOURTH HIS RIGHT TO JOSEPH W. MARSH.

IMPROVEMENT IN DEVICES FOR DETACHING HORSES.

Specification forming part of Letters Patent No. 168,227, dated September 28, 1875; application filed August 14, 1875.

*To all whom it may concern:*

Be it known that I, JESSE CARPENTER, of Sheridan, in the county of Montcalm and in the State of Michigan, have invented certain new and useful Improvements in Detaching Apparatus for Vehicles; and do hereby declare that the following is a full, clear, and exact description thereof, reference being had to the accompanying drawings, and to the letters of reference marked thereon, making a part of this specification.

My invention relates to devices for coupling and uncoupling thills or a pole to and from a vehicle; and it consists in a pivoted face-plate with two horizontal coupling-rods and one perpendicular operating-rod with spring, so arranged that by pressing down on the perpendicular rod the thills or pole will be instantaneously detached from the vehicle, as will be hereinafter more fully set forth.

The annexed drawing represents a front elevation of a vehicle embodying my invention.

A represents the front axle of a buggy or other vehicle. In the center, to the front side of the axle A, is pivoted a wheel or face-plate, B, of suitable dimensions, having two rods, C C, pivoted to it at diametrically-opposite points. These rods pass outward from the face-plate B in opposite directions, through the ordinary axle-clips $a\ a$, as guides to the thill-clips or thill-couplings $b\ b$, the ends of the rods forming the coupling-pins for the same, to fasten the thills or pole therein. D is an upright bar or rod, also pivoted to the wheel or face-plate B, and extending through suitable guides in front of the dash-board. This rod is surrounded by a spiral spring, $d$, which holds it up, and thereby operates on the face-plate, to hold the coupling-rods C C in the thill-couplings.

In case of the horse or horses running away the person seated in the vehicle can press down upon the rod D, thereby turning the wheel or face-plate on its pivot, withdrawing the rods C C from the thill-couplings, and thereby instantaneously detaching the thills or pole from the vehicle. It is also very useful in shifting the pole or thills, as it can be done in an instant.

Having thus fully described my invention, what I claim as new, and desire to secure by Letters Patent, is—

The combination, in a vehicle, of the pivoted wheel B, horizontal rods C C, thill-clips $b\ b$, perpendicular rod D, and spring $d$, substantially as and for the purposes set forth.

In testimony that I claim the foregoing I have hereunto set my hand this 30th day of June, 1875.

JESSE CARPENTER.

Witnesses:
J. S. MANNING,
H. P. NORTON.